US007707117B1

(12) United States Patent
Jimenez et al.

(10) Patent No.: US 7,707,117 B1
(45) Date of Patent: Apr. 27, 2010

(54) METHOD AND APPARATUS FOR COMMUNICATING STATE INFORMATION IN AN ELECTRONIC TRANSACTION MESSAGE

(75) Inventors: Michael Pe Jimenez, San Carlos, CA (US); Robert John Ford, San Jose, CA (US); William A. Wright, Los Gatos, CA (US)

(73) Assignee: Cybersource Corporation, Mountain View, CA (US)

( * ) Notice: Subject to any disclaimer, the term of this patent is extended or adjusted under 35 U.S.C. 154(b) by 1275 days.

(21) Appl. No.: 10/396,211

(22) Filed: Mar. 24, 2003

(51) Int. Cl.
*G06Q 20/00* (2006.01)
(52) U.S. Cl. .......................... 705/64; 726/26
(58) Field of Classification Search .................. 705/57, 705/64; 726/26
See application file for complete search history.

(56) References Cited

U.S. PATENT DOCUMENTS

| 6,011,849 | A | 1/2000 | Orrin |
| 6,061,454 | A * | 5/2000 | Malik et al. ................. 380/278 |
| 6,240,185 | B1 * | 5/2001 | Van Wie et al. ............. 380/232 |
| 6,557,103 | B1 | 4/2003 | Boncelet, Jr. et al. |
| 2002/0097884 | A1 * | 7/2002 | Cairns ....................... 381/71.4 |

OTHER PUBLICATIONS

Merchant Account Basics, 2000, E-Comerce Exchange, p. 1, http://www.ecx.com/html/content/merchant.shtml.*

Cover, Robin, W3C XML Protocol, Aug. 3, 2001, Oasis, p. 1, http://xml.coverpages.org/xp-w3c.html.*

Radcliff, Deborah, Steganography: Hidden Data, Jun. 10, 2002, Computerworld, p. 1, http://www.computerworld.com/securitytopics/security/story/0,10801,71726,00.html.*

Identifier, American Heritage Dictionary, p. 2, http://dictionary.reference.com/browse/identifier.*

Steganography, Webster's Revised Unabridged Dictionary, p. 1, http://dictionary.reference.com/browse/steganography.*

(Continued)

*Primary Examiner*—Andrew J. Fischer
*Assistant Examiner*—Jamie Kucab
(74) *Attorney, Agent, or Firm*—Hickman Palermo Truong & Becker LLP

(57) ABSTRACT

A method and apparatus are disclosed for communicating state information in an electronic message. First data representing a state of an electronic transaction is encoded, to result in creating an encoded message element that is impractical for a recipient to decode. For example, steganographic invisibility encoding may be used. The encoded message element is sent as part of a first message associated with the transaction. A second message associated with the transaction is received, and the third message includes the encoded message element. The encoded message element is decoded, to result in recovering the state of the transaction, which is used in processing the second message. As a result, large volumes of state information are sent to clients for local, transitory storage, precluding the need for a large state data store on the server side.

22 Claims, 8 Drawing Sheets

OTHER PUBLICATIONS

Inoue et al. A Proposal on Information Hiding Methods using XML. 1st NLP and XML Workshop [online], Nov. 30, 2001, [Retrieved on Jan. 26, 2009]. Retrieved from the Internet:<http://hal2001.itakura.toyo.ac.jp/~chiekon/nlpxml/inoue.pdf>.*

Burdett, D. Internet Open Trading Protocol (IOTP) Version 1.0. The Internet Society Network Working Group RFC 2801 [online], Apr. 2000 [retrieved on Jan. 26, 2009]. Retrieved from the Internet:<http://www.ietf.org/rfc/rfc2801.txt>.*

Bruce Schneier, "Applied Cryptography, Protocols, Algorithms, and Source Code in C," 1996, pp. 9-10.

Svet Braynov, "Introduction to Steganography," Feb. 11, 2003, 13 pages.

Neil F. Johnson, "Publications, articles, and other documents," http://www.jjtc.com/stegdoc/, printed Jul. 2, 2003, pp. 1-14.

* cited by examiner

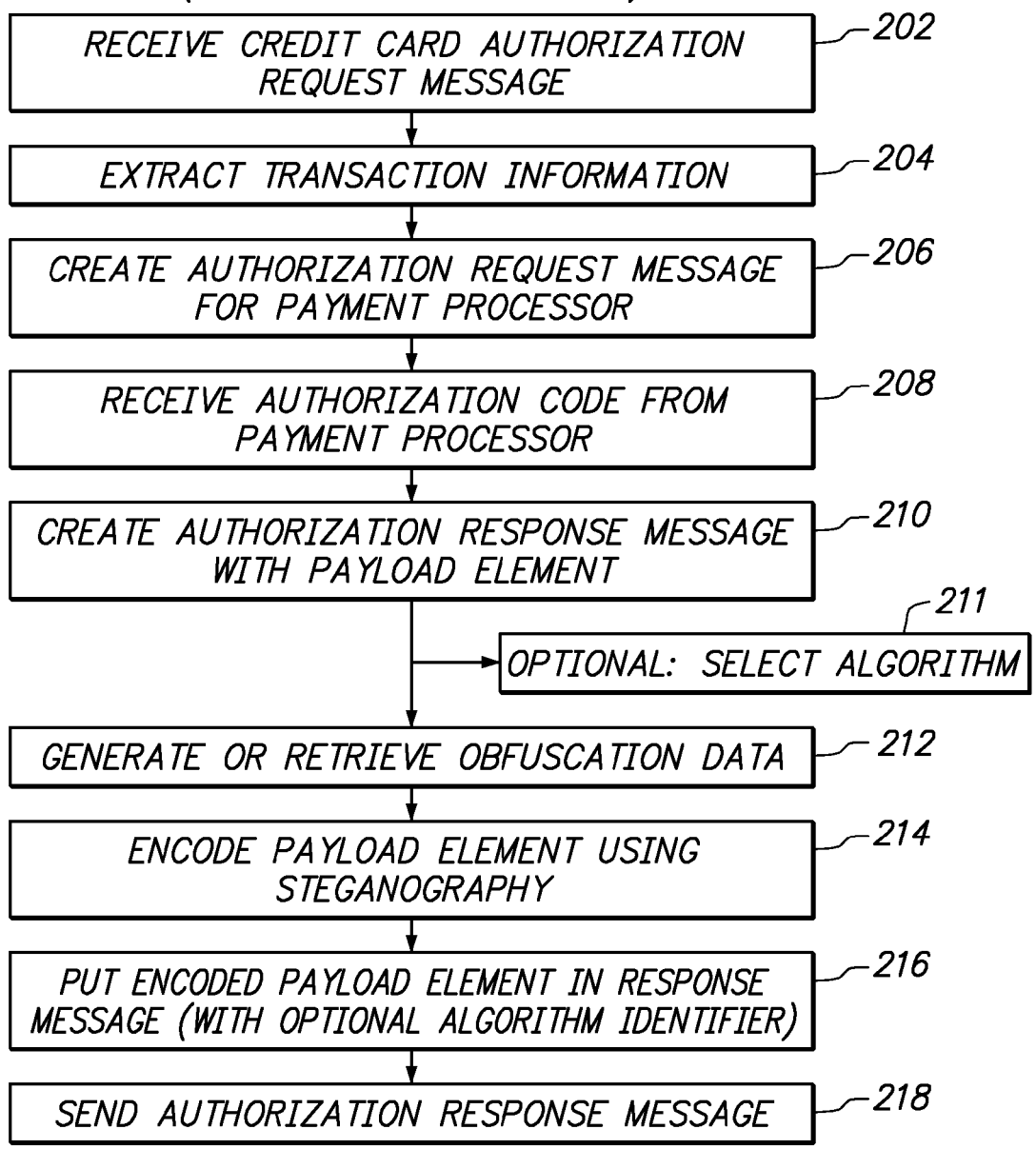

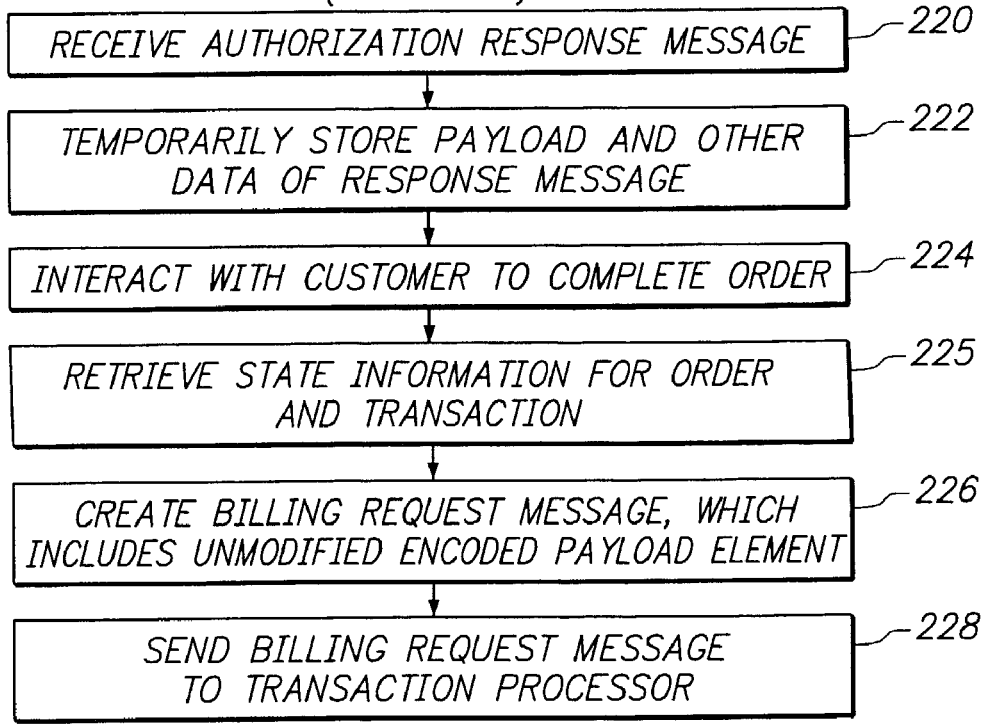
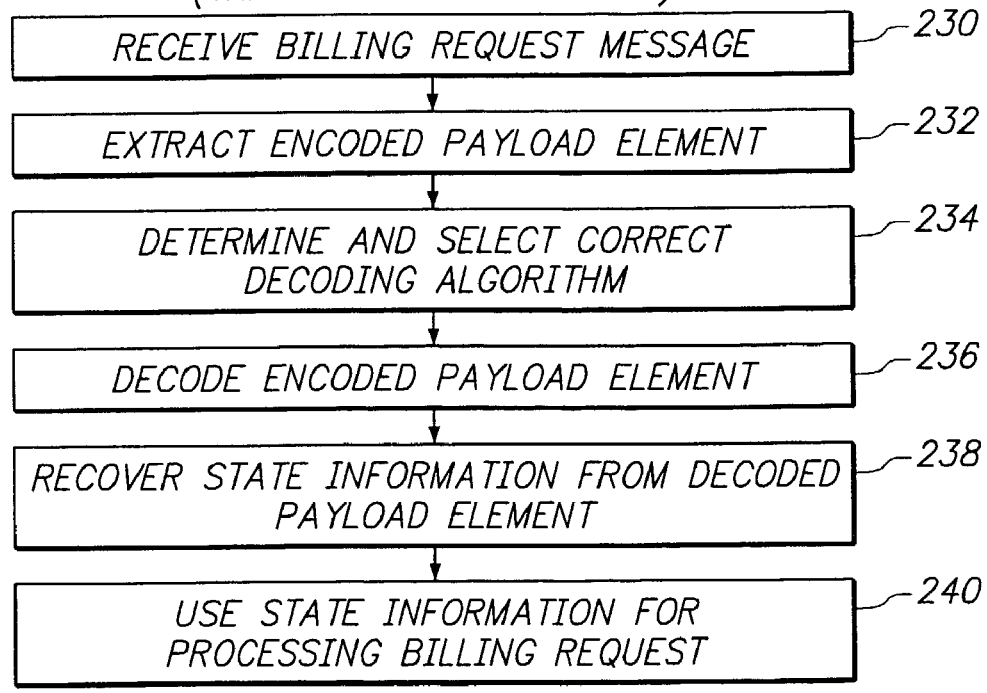

METHOD AND APPARATUS FOR COMMUNICATING STATE INFORMATION IN AN ELECTRONIC TRANSACTION MESSAGE

FIELD OF THE INVENTION

The present invention generally relates to data processing in the field of client-server transaction processing. The invention relates more specifically to a method and apparatus for communicating state information in an electronic transaction message.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Client-server computer systems are commonly used to provide electronic transaction processing services over public data networks. In these systems, a large number of client systems, which are distributed across one or more networks, are serviced by a server site. Because each client system normally requires server resources for only a short time, one server site can often service hundreds, thousands or even millions of clients.

For example, online electronic commerce is supported, in part, by transaction processing systems that interact with numerous distributed merchant systems. When a customer contacts a merchant to perform an electronic commerce transaction, the customer may provide a credit card number for payment of goods or services. The merchant establishes a connection to a transaction processor, and sends a request message containing customer identification information, a credit card number, an order amount, and other information; thus, the merchant requests the transaction processor to authorize the credit card for the specified amount. The transaction processor contacts a payment processor to request a reservation of credit equal to the specified amount, etc. In response, the transaction processor receives an authorization code and associates it with the credit card number, amount, merchant identifier, and other information representing a state of the credit card transaction.

Later, the merchant may wish to capture an amount of value equal to the purchase amount. Accordingly, the merchant may request the transaction processor to perform a billing operation in which the customer is charged for the specified amount. In the billing request, the authorization code is referenced. In response, the transaction processor must locate all other information relating to the transaction, based on the authorization code, so that a billing operation can be performed.

In this context, and in other client-server contexts, there is a need to store a large volume of information representing the state of numerous transactions. In the electronic commerce transaction example given above, the transaction processor and the merchant may communicate with a communication protocol using computing elements that do not inherently store state information; that is, the protocol is "stateless." Examples of stateless protocols include HTTP. In this environment, normally the transaction processor creates and stores a transaction record on one of its servers in response to receiving an initial message from the merchant for a particular transaction. The transaction record contains a transaction identifier, information about the parties to the transaction, the nature of the transaction, etc. If the transaction processor is servicing a large number of merchants who have a large number of customers, over time, vast volumes of state information must be maintained.

In one approach, the state information is stored on the server side, for example, in data storage equipment that is accessible to the transaction processor. However, this approach requires large amounts of data storage equipment, driving up costs for the transaction processor. There may be millions of state records stored on dozens or hundreds of disk storage units, for example. If transaction volume fluctuates widely, which can occur during seasonal sales cycles, periodically the transaction processor may have far too little or far too much storage capacity.

Further, this approach is non-scalable, because the amount of required data storage equipment tends to increase approximately linearly with transaction volume. In addition, the data storage equipment and the data require management, increasing personnel costs for the transaction processor.

Still another disadvantage of this approach is that the majority of the data is not needed, or discarded, after a relatively short time. For example, in credit card transaction processing, in one system approximately 70% of all credit card authorizations result in a billing operation within the same day. While the authorization codes are typically valid for seven days, the state information is essentially needed only for a short period, but storing it for that period has a high cost.

Another problem of this approach is that if storage of the state information is spread across multiple machines, significant overhead is introduced when a particular authorization code is searched. Therefore, typical front-send servers of transaction processors have extremely high capacity and other performance characteristics, and are expensive.

Another approach is to require each client to store all its own state information. Since the client provided the original transaction information and receives other state information back from the server, such as the authorization code in the credit card example given above, the client has all pertinent state information available to it for storage. However, this approach has significant drawbacks. First, in many contexts it would require a major change in the way clients do business, require reprogramming their systems, and require capital investment in data storage systems. Second, in the context of e-commerce transaction processing, many merchants do not wish to store credit card numbers for liability and risk containment reasons.

Thus, there is a need for a way to store large volumes of state information for electronic transactions, without requiring server-side storage of the information.

It would be especially useful to have a way to maintain large volumes of state information without large amounts of data storage equipment.

Steganography is a technique of hiding a secret message in another message, such that the very existence of the secret message is concealed. In one approach, the sender writes an innocuous message and then conceals a secret message on the same piece of paper. Historical variants include invisible inks, tiny pin punctures on selected characters, minute differences between handwritten characters, pencil marks on typewritten characters, grilles that cover most of the message except for a few characters, and others.

More recently, steganography has been used to conceal an electronic message in a graphical image. For example, the least significant bit of each byte of a graphic image may be modified such that extracting and assembling all such least significant bits provides the message. The visual appearance of the graphical image does not change appreciably, because most graphics standards specify more gradations of color than the human eye can notice. Using this technique, a 64-kilobyte message can be concealed in a 1024×1024-bit grayscale image. Another recently developed steganographic technique involves the use of obfuscation functions or "mimic functions." Such functions modify a message so that its statistical profile resembles that of something else that does not appear to comprise an encoded message.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram of a process of communicating state information in an electronic merchant transaction processing message;

FIG. 2B is a flow diagram showing a process of using state information from an electronic transaction message in an e-commerce transaction;

FIG. 2C is a flow diagram showing a process of using state information from an electronic transaction message in a billing transaction;

DETAILED DESCRIPTION OF THE PREFERRED EMBODIMENT

Figure 1A:
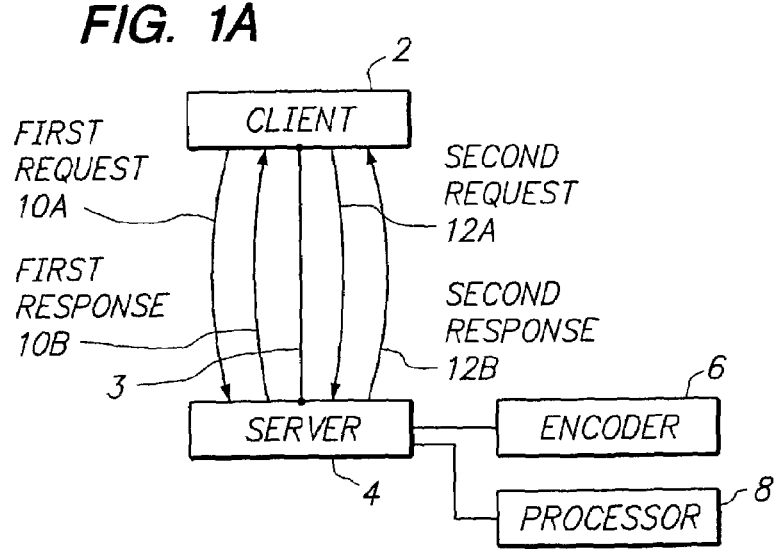
FIG. 1A is a block diagram of a system that may be used to communicate state information in an electronic message.

A method and apparatus for communicating state information in an electronic transaction message is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Communicating State Information in an Electronic Transaction Message -continued 4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one embodiment, a method and apparatus for communicating state information in an electronic transaction message. First data representing a state of an electronic transaction is encoded, to result in creating an encoded message element that is impractical for a recipient to decode. For example, steganographic invisibility encoding may be used. The encoded message element is sent as part of a first message associated with the transaction.

A second message associated with the transaction is received, and the third message includes the encoded message element. The encoded message element is decoded, to result in recovering the state of the transaction, which is used in processing the second message. As a result, state information is sent to clients for local, transitory storage, precluding the need for a large state data store on the server side.

In other aspects, the invention encompasses a computer apparatus and a computer-readable medium configured to carry out the foregoing steps.

2.0 Structural and Functional Overview

General-purpose electronic commerce message protocols are used for secure, real-time communication of a set of data from a sending agent's application to a receiving agent's server. Message protocols typically consist of administrative information and a data or message component here referred to as the "payload". An example of such a message protocol would be the Simple Object Access Protocol (SOAP) and/or other XML based protocols. The payload component of the message can consist of a number of sub-components or segments that are termed "fields" for purposes of this discussion. Although the general purpose messages often are protected during transmission by multiple layers of encryption involving well-known mechanisms such a symmetric key cipher and DES-based cryptography solutions, during processing the payload is typically decrypted, and some portions of the payload may need to be placed in data storage. At that point, without additional protection, highly sensitive information in the payload could be vulnerable to security risk.

For purposes of discussion, assume that, one of the fields of the payload will contain extremely sensitive information and it is desirable that, even after message decryption, the contents of that field are not directly visible or transparent but rather should remain opaque or extremely difficult to see. Encoding techniques described herein provide that, even after the removal of all layers of general message encryption, the contents of the specified payload field remain opaque. In the encoding techniques, the specified payload field is strongly encoded through dynamically shifting combinations of various steganographic obfuscation techniques.

In one approach, a number of steganographic encoding algorithms are used over a given time frame. Periodically the time frame shifts and a different set of algorithms is put in service. In this approach, both the length of the periodic time frame and the number and makeup of the algorithms in service during a given time frame varies dynamically. Additionally, the combination of techniques constituting the steganographic algorithms themselves are varied both within and across time frames.

According to one embodiment, storage of state information in a client-server transaction processing system is eliminated, without requiring a modification of the protocol or workflow by which clients interact with the server. Using the techniques described herein, state information is maintained, but the direct and indirect costs associated with server-side storage of large amounts of state information are substantially eliminated.

FIG. 1A is a block diagram of a system that may be used to communicate state information in an electronic message. A client 2 is communicatively coupled by a communications link 3 to a server 4. Communications link 3 may be implemented by any medium or mechanism that provides for the exchange of data between client 2 and server 4. Examples of communications link 3 include, without limitation, a network such as a Local Area Network (LAN), Wide Area Network (WAN), Ethernet or the Internet, or one or more terrestrial, satellite or wireless links.

Server 4 includes or accesses an encoder 6 and a processor 8. Encoder 6 can encode state information about a transaction. Processor 8 can process transactions and messages under control of appropriate instructions. Client 2 and server 4 communicate messages, including first request 10A, first response 10B, second request 12A, and second response 12B, on link 3.

Figure 1B:
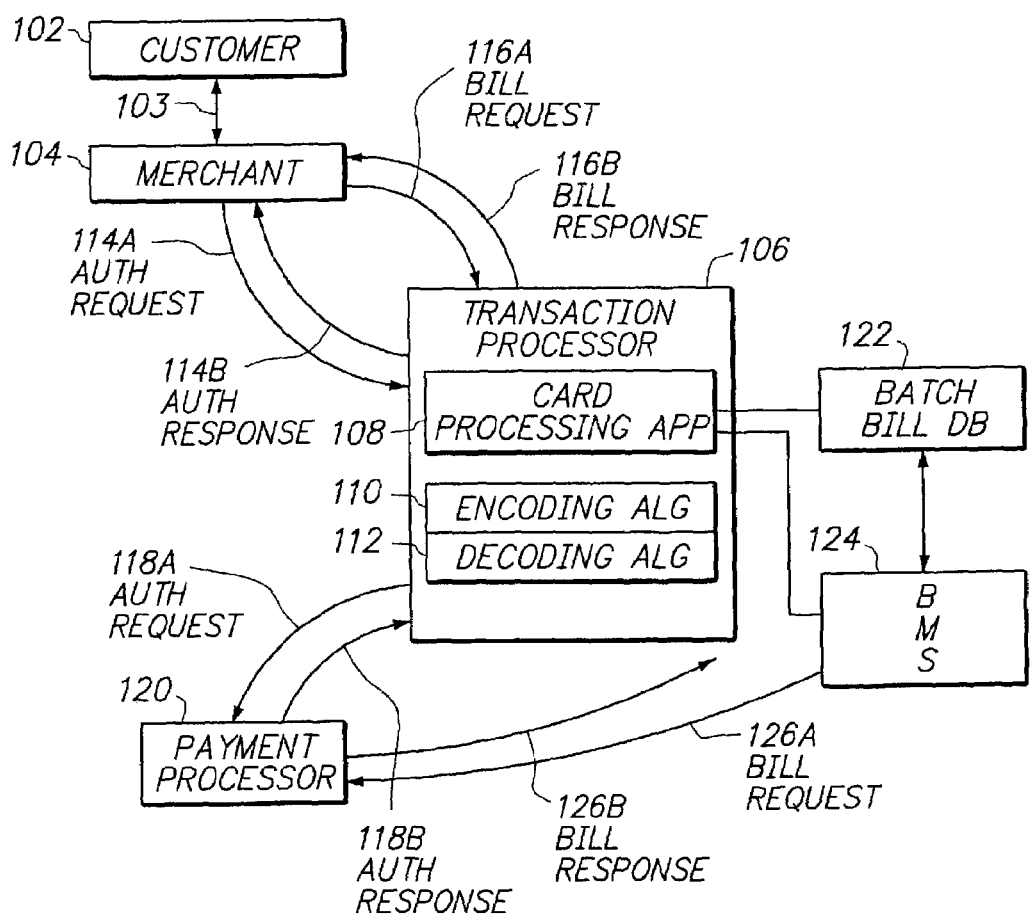
FIG. 1B is a block diagram of a merchant transaction processing system that may be used to communicate state information in an electronic commerce transaction message.
Figure 1C:
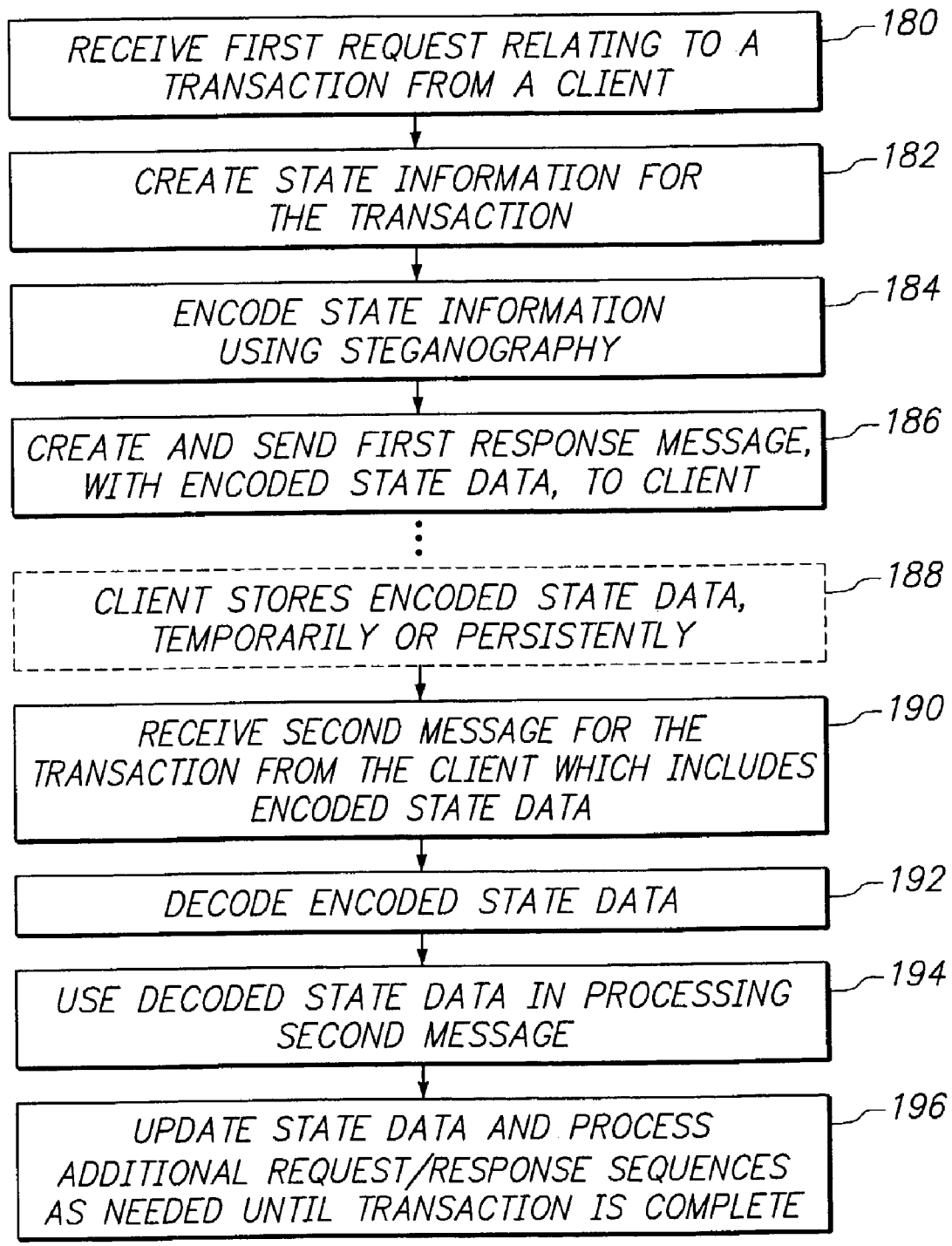
FIG. 1C is a flow diagram that provides a high-level view of a process of communicating state information in an electronic message.

FIG. 1C is a flow diagram that provides a high-level view of a process of communicating state information in an electronic message. In block 180, a first request relating to a transaction is received from a client. For example, with reference to FIG. 1A, server 4 receives first request 10A from client 2. In block 182, state information is created for the transaction, for example, at server 4. The state information may include data identifying client 2, the nature of the transaction, values necessary for processing the transaction, etc.

In block 186, the state information is encoded. For example, server 4 encodes the state information using encoder 6. The state information is encoded in a manner that is impractical for the client to decode, providing security. In one embodiment, a steganographic encoding approach is used.

The encoded message is sent to the client as part of block 186. For example, server 4 sends first response 10B to client 1. In block 188, the client stores the encoded state data, temporarily or persistently. Thus, client 2 may store the encoded state information upon receiving first response 10B. Client 2 stores the encoded state information based on a prior agreement with server 4 to do so, without attempting to decode the encoded state information.

In block 190, a second message for the same transaction is received from the client. The second message includes the encoded state information. For example, client 2 passes the encoded state information back to server 4 as part of second request 12A. In this way, server 4 receives all state information necessary to continue processing the then-current transaction, without having to store the state information locally itself.

In block 192, the encoded state information is decoded; for example, server 4 provides the encoded state information to encoder 6, which applies a complementary decoding algorithm to yield decoded state information. In block 194, the decoded state information is used in processing the second request or other aspects of the transaction. As indicated in block 196, the state data may be updated and additional request/response sequences may be processed until a particular transaction is complete, or for new transactions that are related to the first transaction as in a chain. For example, steps 184 to 194, inclusive, may be repeated as necessary with new state information or as part of new request/response sequences until transaction processing is complete.

Embodiments of FIG. 1A and FIG. 1C may be used in the context of processing e-commerce transactions for merchants, such as credit card payment authorization followed by credit card billing. In such embodiments, instead of storing card authorization information in a database, the information is encoded and sent to the merchant as a data element that the merchant is required to store but not decode or use. In past approaches, merchants have been required to store an authorization code for later reference in requesting a billing operation, and therefore little additional burden is imposed by distributing storage of state information to the merchants. The encoded message element typically has a length on the order of a few dozen bytes to a few hundred bytes, which does impose a significant storage burden. Because the each merchant stores only state information pertaining to transactions in which that merchant is involved, far less data is stored by each merchant as compared to the transaction processor in prior approaches. Further, after the merchant returns the encoded message element to the transaction processor for use in a billing transaction, the merchant may delete the encoded message element at its discretion.

Using the approach herein, in the context of performing a credit card billing operation following an earlier authorization operation, all information necessary to perform the billing operation is provided within the billing request message. No database lookup is required, and no storage of state information is needed. The billing request message can be converted immediately to a batch billing request for an external batch billing management system.

3.0 Communicating State Information in an Electronic Transaction Message

FIG. 1B is a block diagram of a system that may be used to communicate state information in an electronic transaction message. For purposes of illustrating a clear example, FIG. 1B and certain other drawing figures herein show credit card authorization and billing as used in e-commerce transactions; however, embodiments are applicable to any context in which a message is communicated among parties that need to retain or use state information pertaining to any kind of transaction.

A customer 102 is communicatively coupled by link 103 to a merchant 104. Link 103 may be a communication link of any form, including a direct connection, a network link, a wireless link, etc. In one embodiment, customer 102 communicates with merchant 104 indirectly through one or more networks or internetworks, such as the public internet. Merchant 104 is communicatively coupled to a transaction processor 106. Merchant 104 interacts with the transaction processor 106 using request messages and response messages, as described further below.

Transaction processor 106 comprises a card processing application 108, encoding algorithm 110, and decoding algorithm 112. A batch billing database 122 and billing management system 124 are associated with or accessible to the transaction processor 106. In alternative embodiments, batch billing database 122 and billing management system 124 may be integrated with transaction processor 106.

Transaction processor 106 communicates with a payment processor 120 for the purpose of requesting credit card authorization and billing operations. Payment processor 120 is responsible for transferring value from an account associated with customer 102 to an account associated with merchant 104 when a purchase transaction completes. Payment processor 120 also interacts with databases of credit card issuers to determine whether customer 102 has sufficient credit for a particular transaction.

FIG. 2A is a flow diagram of a process of communicating state information in an electronic transaction message. For purposes of illustrating a clear example, FIG. 2A and certain other drawings are described with reference to FIG. 1B; however, embodiments are applicable to any context in which a message is communicated among parties that need to retain or use state information pertaining to any kind of transaction.

Further, for example purposes, the following description of FIG. 2A assumes that customer 102 and merchant 104 are engaged in an e-commerce transaction in which the customer is ordering goods or services from the merchant and providing credit card payment. State information is communicated between the merchant 104 and transaction processor 106. However, embodiments are applicable to any other context in which parties communicate state information.

In block 202, a credit card authorization request message is received. For example, transaction processor 106 receives an authorization request message 114A from merchant 104. In block 204, transaction information is extracted. Block 204 may involve extracting a customer name, credit card number, expiration date, order amount, customer address, and other information relating to the transaction that is provided by the merchant to the transaction processor.

In block 206, an authorization request message for a payment processor is created. For example, transaction processor 106 creates and sends authorization request message 118A to payment processor 120. The authorization request message includes information sufficient for the payment processor 120 to determine whether customer 102 is authorized to charge a particular amount to the specified credit card. Payment processor 120 determines, based on its own database, external databases, or other resources, whether the customer 102 is authorized to make the charge.

In block 208, an authorization code is received from the payment processor. For example, if payment processor 120 determines that customer 102 is authorized for the requested charge, the payment processor creates an authorization code and provides it to the transaction processor in authorization response message 118B.

In response, in block 210, the transaction processor creates an authorization response message containing a payload element. The payload element is loaded with state information relating to the then-current transaction. For example, the payload element comprises one or more data fields that store a credit card number, customer identifying information, and order identifying information. Typically, the authorization code is stored outside the payload element as a separate message field, thereby exposing it to the merchant for use later in the transaction. Structures used for the authorization response message and payload element are not critical.

In block 211, optionally, an encoding algorithm is selected. Processes for selecting encoding algorithms are described further below in relation to FIG. 4B.

In block 212, obfuscation data is generated or retrieved. In one alternative, a set of obfuscation data is generated "on the fly" at block 212 for later use in obfuscating state information that is stored in the payload element. In another approach, a pool of obfuscation data is created in advance and stored; then, at block 212, a set of obfuscation data is selected from the pool, and used for obfuscating the state information in the payload element. The obfuscation data may be randomly generated or may comprise non-random data which, when combined with the state information, does not reveal the presence of the state information.

In block 214, the payload element is encoded using steganography. An obfuscation algorithm or steganographic invisibility or distribution algorithm is applied to the state information and the obfuscation data. As a result, an encoded payload element is created.

In one steganographic approach, first data, representing state information for a transaction, is hidden among second data, forming an encoded message element that is sent to the client as part of a transaction message. The resulting encoded message element is unintelligible. In an alternative embodiment, the resulting encoded message element is intelligible, but does not appear to contain another message or an encoded message element. In this alternative approach, the second data may be randomly selected.

The first data is hidden among a sufficient quantity of second data to render the resulting encoded message unintelligible and impractical to decode. In one embodiment, a ratio of one unit of first data to three units of second data is used, termed a "wheat to chaff" ratio of 1:3. A ratio of 1:3 has been determined to result in an encoded message element for which it is harder, computationally, to identify a credit card number within the encoded message element than it would be to use a brute-force method to generate a valid credit card number. Other ratios may be used, depending upon the risk tolerance and security requirements of the transaction processor or its clients.

Any of a plurality of steganographic encoding algorithms may be used. In one embodiment, a plurality of algorithms is defined, and each message carries an identifier of a particular algorithm that was used to encode the remainder of the encoded message element. The identifier may form part of the encoded message element, or another part of the message. When the encoded message element is received back from a client, a correct decoding algorithm is selected based on the identifier.

In another variant of this approach, successive messages may be encoded using different encoding algorithms selected from among a set of available algorithms. Use of a set of available algorithms improves security against a "man in the middle" attack. The particular encoding algorithm that is used for a particular encoded message element is specified by an identifier that is carried with the message element or the message. In one example embodiment, five (5) algorithms are used.

In yet another alternative, multiple sets of algorithms are used. When all algorithms in a first set have been used, subsequent algorithms are selected from a second set, and the first set is reused only after a specified time or quantity of messages have been encoded. The sets of algorithms may be selected from a superset of all algorithms using a sliding window to define the then-current set.

Various optimizations may be used. For example, the transaction processor may convert numeric values in the source fields for the encoded message element into bit strings before encoding the values.

In block 216, the encoded payload element is placed in the response message by substituting it for the original payload element. By advance agreement, the recipient of a message that includes the encoded payload element is required to store and return the encoded payload element with any later request that relates to the then-current message. For example, by advance arrangement among transaction processor 106 and merchant 104, the merchant is required to store an encoded payload element that is received as part of an authorization response, and to return the encoded payload element to the transaction processor in any later billing request message that relates to the same transaction. The transaction processor 106 may declare, for example, that the encoded payload element is a private but required data field that the merchant must return in a billing request.

Optionally, an algorithm identifier is stored in the payload element. The algorithm identifier specifies which steganographic invisibility algorithm was used for encoding, so that the transaction processor can later apply a correct decoding algorithm to the message. The algorithm identifier may be omitted when only one encoding algorithm and decoding algorithm are used.

In block 218, the authorization response message is sent. In the example of FIG. 1B, transaction processor 106 sends authorization response message 114B to the merchant 104. This provides the merchant 104 with an authorization code for use in continuing or completing a transaction with the customer 102. Although state information is present in the authorization response message in the encoded payload element, the state information is not accessible to the merchant. This does not affect the transaction adversely for the merchant, which already has complete information on hand about the transaction.

FIG. 2B is a flow diagram showing a process of using state information from an electronic transaction message in an e-commerce transaction. FIG. 2B represents process steps performed at a client, such as merchant 104 of FIG. 1B, after the process of FIG. 2A.

In block 220, the authorization response message sent in block 218 of FIG. 2A is received. In block 222, the payload of the authorization response message and other data, such as header data, is stored at the client. Block 222 may involve transitory storage in memory or persistent storage in a client-side database.

In block 224, local processing is performed at the client side. The local processing may vary depending on the particular application or context. In the context of FIG. 1B, local processing may involve merchant 104 interacting with customer 102 to complete an order. In such a context, merchant 104 typically does not need to use any information that is found in the encoded payload element. The merchant merely receives the authorization code provided by the transaction processor 106, stores the authorization code for later use and reference, and completes an order with the customer.

In block 225, state information for the order or transaction are retrieved. Block 225 comprises retrieving the encoded payload element and other data that was temporarily stored in block 222. In block 226, a billing request message is created. The billing request message includes, unmodified, the encoded payload element that the client received as part of the first response message. The billing request message is sent to the server in block 228. Thus, the client simply returns to the server all the state information that it received in encoded form in the first response message. As a result, the server is not required to store the state information, because during the period between the first response message and the second request message, the client stores the state information in encoded form.

FIG. 2C is a flow diagram showing a process of using state information from an electronic transaction message in a billing transaction. FIG. 2C represents steps that may be performed by a server, such as transaction processor 106, after steps of FIG. 2B.

In block 230, a billing request message is received. The billing request message is the same that was sent in block 228 of FIG. 2B. For example, transaction processor 106 receives billing request message 116A from merchant 104. The billing request message 116A is provided to ask the transaction processor 106 to bill the customer 102 for the goods or services it ordered from merchant 104, and involves the same transaction relating to the prior authorization messages 114A, 114B.

In block 232, the encoded payload element is extracted from the billing request message. For example, transaction processor 106 identifies the encoded payload element and temporary stores it in memory for use during the remainder of the steps of FIG. 2C. In block 234, the correct decoding algorithm is determined and selected. If multiple encoding algorithms are in use, block 234 may involve reading an identifier in the message that specifies the correct algorithm. In block 236, the encoded payload element is decoded using the selected algorithm. As a result, in block 238, the state information is recovered from the decoded payload element.

In block 240, the state information is used for processing the billing request message. For example, transaction processor 106 may use the state information to construct a billing request message 126A that is sent to payment processor 120. When billing is complete, payment processor 120 provides a billing response 126B. Transaction processor 106 may perform billing operations in a batch mode by storing information about future billing transactions in a batch billing database 122, which is managed by a billing management system 124. Periodically, such as once a day, billing management system 124 sends a batch of billing request messages 126A to payment processor 120 for all records represented in batch billing database 122.

Figure 3:
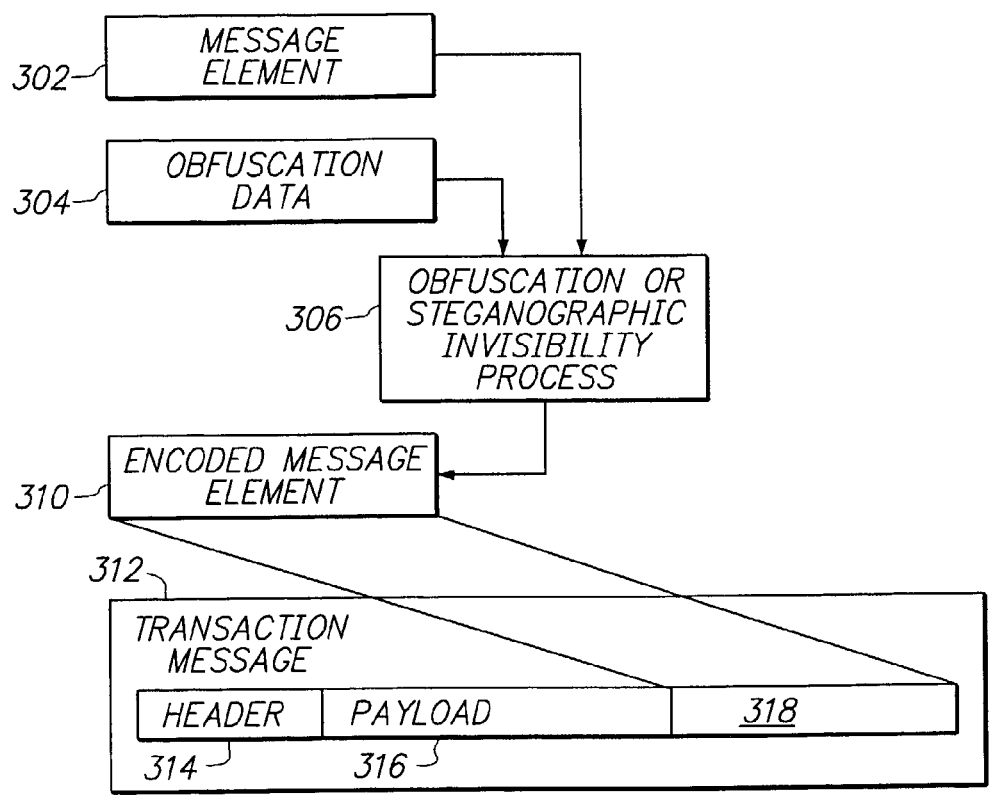
FIG. 3 is a data flow diagram showing a process of creating an encoded message element.

FIG. 3 is a data flow diagram showing a process of creating an encoded message element. The data flow of FIG. 3 may be used to perform encoding a message element as part of block 184 of FIG. 1B or block 214 of FIG. 2A.

Message element 302 comprises one or more data fields of a message relating to a transaction. Obfuscation data 304 represents a set or pool of data that is combined with message element 302 using an obfuscation process or steganographic invisibility process 306 to result in creating encoded message element 310. Obfuscation data 304 may be random, pseudo-random, or non-random, and may have any useful data format.

Encoded message element 310 is incorporated into a transaction message 312 that may have a header 314 and payload 316. For example, encoded message element 310 is inserted into transaction message 312 as a field 318. Alternatively, the encoded message element 310 may comprise the entire payload 316. Transaction message 312 may be a message that conforms to any protocol, including Simple Object Access Protocol (SOAP) and/or other XML-based protocols.

Figure 4A:
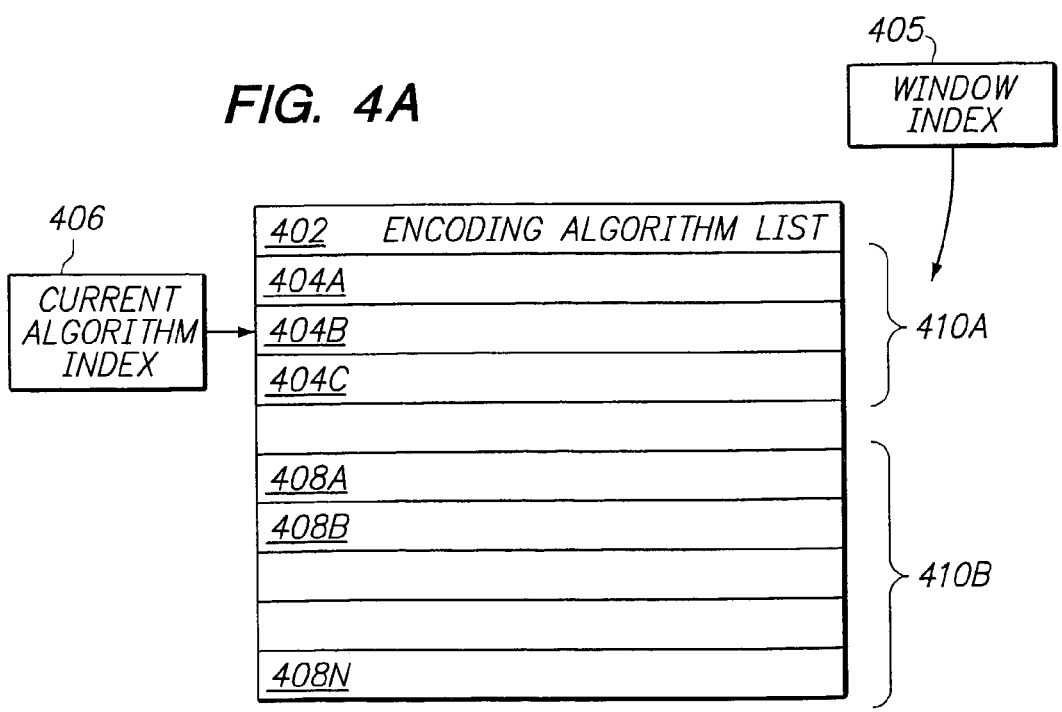
FIG. 4A is a block diagram showing an encoding algorithm list.
Figure 4B:
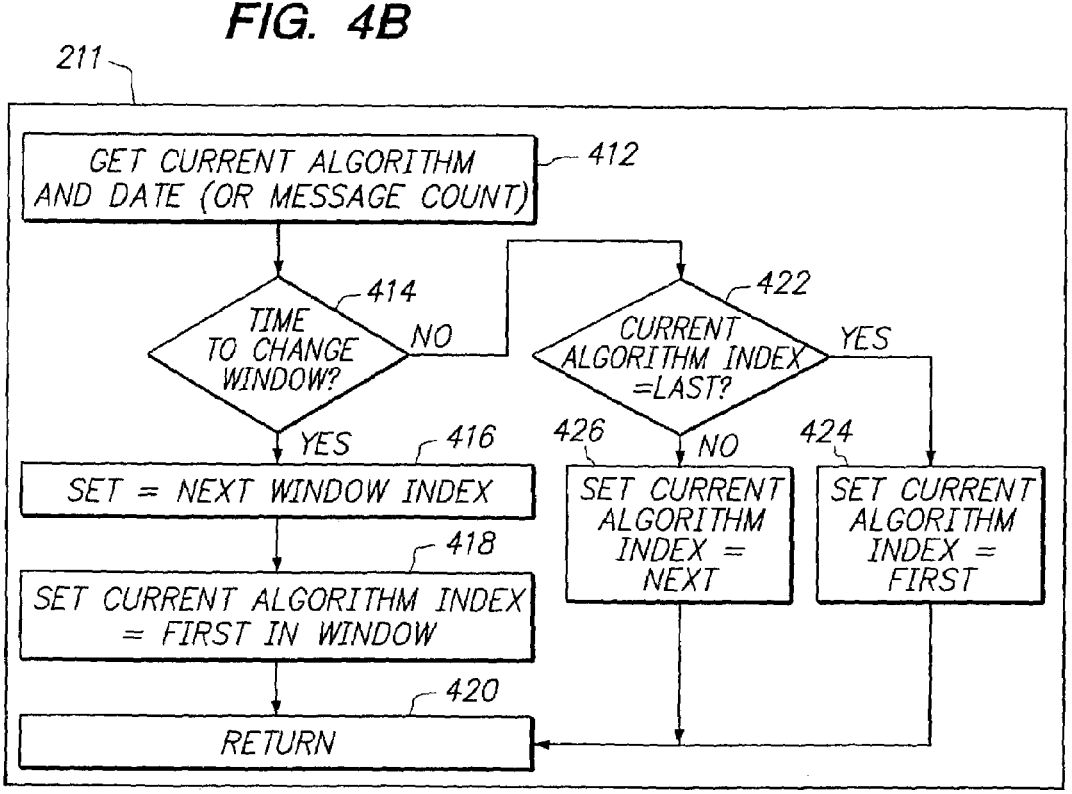
FIG. 4B is a flow diagram showing a process of selecting an encoding algorithm.

FIG. 4A is a block diagram showing an encoding algorithm list. FIG. 4B is a flow diagram showing a process of selecting an encoding algorithm. Referring first to FIG. 4A, encoding algorithm list 402 comprises a plurality of entries 404A, 404B, 404C, 408A, 408B, 408N. Each of the entries references, identifies or comprises a different encoding algorithm that may be used to encode transaction information and message elements. In one embodiment, a current algorithm index value 406 points to a current algorithm. The current algorithm is used to encode all encoded message elements. The index value 406 is moved periodically so that successive messages are encoded using different algorithms.

In another embodiment, the encoding algorithm list 402 is organized as a plurality of windows 410A, 410B. A window index value 405 identifies a current window 410A, 410B. The current algorithm index value 406 moves only within a current window. When the end of the current window is reached, the current algorithm index value 406 resets to the beginning of the window. Periodically a new window is selected. When a new window is selected, the current algorithm index value 406 is set to the first algorithm within the new window, and moves only within the new window. In this way, the particular algorithm used to encode a message element changes continuously, improving security of the system.

The process of FIG. 4B may be used to determine a particular algorithm for use in encoding a particular message element. In block 412, the current algorithm is determined, along with other data that may be used to determine whether to change algorithms, such as the then-current date, message count, or other information. In block 414, a test is performed to determine whether the current window should be changed. The date, message count, or other information determined in block 412 may form a basis for the test of block 414.

If the current window is not changed, then control passes to block 422, in which a test is performed to determine whether the current algorithm index value 406 is at the last algorithm of a window. If so, then in block 424 the index value 406 is reset to the first algorithm of a window. If not, then in block 426 the index value 406 is reset to the next algorithm within the then-current window. After either block 424 or block 426, control passes to block 420.

If the current window is changed, then control passes to block 416, in which the window index value is set to the next window. For example, if window index value 405 is pointing to window 410A, it is set to point to window 410B. In block 418, the current algorithm index value 406 is set to the first algorithm in the new window. In block 420, control returns, for example, to a process that is performing an encoding operation.

Using the structures and processes of FIG. 4A, FIG. 4B, message elements of successive messages may be encoded with different encoding algorithms selected from a rotating list, or selected from a plurality of rotating lists.

Figure 5:
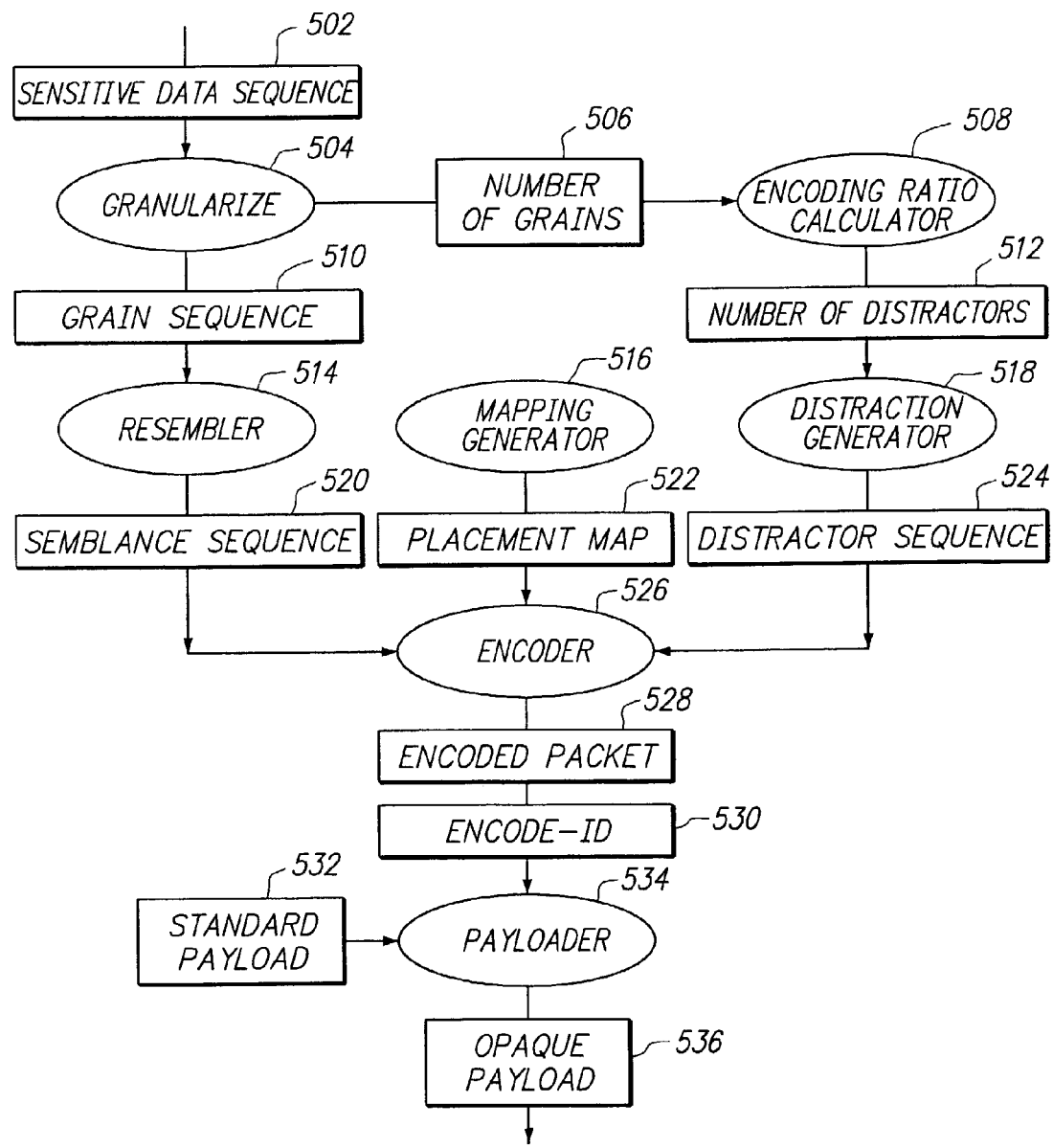
FIG. 5 is a flow diagram illustrating a steganographic obfuscation approach.

FIG. 5 is a flow diagram illustrating a steganographic obfuscation approach. In this description, using the wheat-and-chaff metaphor that is widely used in other technical descriptions relating to steganography, the payload field that is to be obfuscated is termed "wheat," granular or atomic components of the wheat are "grains of wheat," surrounding distractor data are "chaff," the process of scattering grains of wheat among quantities of chaff is "encoding" and the process of recovering the original extra-sensitive data sequence is "winnowing" or "decoding."

In general, the steganographic algorithms that are used have the following features:
1. A method for breaking extra-sensitive information into granular parts or grains.
2. A method for generating or choosing a distractor set.
3. A method for disguising grains to appear indistinguishable from distractors.
4. A method for determining the steganographic encoding ratio.
5. A method for generating a placement map to determine the sequence and location of grains in the distractor mix.
6. A method for generating an identifier which fully qualifies the algorithmic combination of methods 1-5 used to achieve the encoding and facilitate decoding.
7. A placement strategy for hiding the encoded packet in plain view.

In general, the process shown in FIG. 5 involves the following steps:
1. Break wheat into grains.
2. Disguise grains to resemble distractors.
3. Determine steganographic encoding ratio.
4. Generate distractor set.
5. Generate grain-placement map.
6. Encode packet and generate encode-id.
7. Place encoded packet in payload.

Referring now to FIG. 5, a sensitive data field or sequence 502 is subjected to a granularize process 504 that results in breaking bytes of wheat into half-byte or nibble sized grains, yielding grain sequence 510. The grain sequence 510 is provided to a resembler 514 that applies a "resemblance mask." The resemblance mask is a bit mask that causes the nibble sized grains to be indistinguishable from the nibble-sized distractors. As a result, a semblance sequence 520 is generated that specifies an ordering of grains and distractors.

Meanwhile, the number of grains 506 in the grain sequence 510 is provided to an encoding ratio calculator 508. Based on current policy for the timeframe and the number of grains, the encoding ratio calculator determines an steganographic encoding ratio that yields a number of distractors 512. A distraction generator 518 generates a distractor set comprising a nibble-sized distractor sequence 524, consisting of the appropriate number of distractors 512 or chaff elements in relation to the number of wheat grains 506.

Mapping generator 516 generates a grain-placement map, which specifies where and in what order the wheat grains of grain sequence 510 are to be placed in the distractor sequence 524. Based on the semblance sequence 520, placement map 522, and distractor sequence 524, an encoder 526 generates an encoded packet 528 and encoding identifier 530. The encoded packet 528 comprises grain sequence 510 combined with distractor sequence 524 as specified by placement map 522 and semblance sequence 520. The encoding identifier 530 specifies the sequences and maps so that the encoded field can be recovered later.

Payloader 534 places the encoding identifier 530 and encoded packet 528 in the standard data payload 532 according to a current placement policy. The placement policy determines how the encoding will be inserted into the payload. The encoded packet may be openly placed in the payload or deceptively placed in a way that deflects attention from it.

The number of distractors per grain of sensitive information is the steganographic "encoding ratio." The resulting mixture of out-of-sequence grains of highly sensitive information scattered across various locations in a distractor set of some size constitutes the steganographic "encoded packet." In this example, the sensitive information undergoing steganographic encoding consists of "state information." The encoded packet of state information, and the accompanying encoding identifier are placed into the message payload, either as an obviously distinct and separate field, or further obfuscated by being hidden in some way among the remaining fields of the payload. The resulting steganagraphically encoded packet and encoding identifier, after placement in the remainder of the message payload, comprise an "opaque payload of state information for an electronic commerce message."

An example is now presented. For clarity, the example leaves out both nibble decomposition and resemblance masking. Assume that, in the following message payload, STATUS is considered an extremely sensitive field:

STATUS=823

Z=481042005

Then the following opaque encoding might result:

Wheat Set=823

Grain Size=1 char

Encoding Ratio=2:1

Distractor Set=145679

Order Map=321
Location Map=158
Encoded Packet=357629481

The values "8", "2", "3" of the wheat set are encoded in the encoded packet in the $8^{th}$, $5^{th}$, and $1^{st}$ positions, respectively. Locations of the wheat values within the chaff are indicated by the location map, which specifies $1^{st}$, $5^{th}$, and $8^{th}$ positions. The order of such locations is indicated by the order map. The value "3" in the order map indicates that the first value of the wheat set ("8") is placed third in order within the location map, and ultimately in the same order in the encoded packet. The values "2" and "1" in the order map indicate that the second and first values of the wheat set ("2", "3"), respectively, are placed second and first in order within the location map.

The encoding ratio is 2:1 and the grain size is one character. Therefore, the distractor set has six values as compared to three values in the wheat set.

Values for the grain size, encoding ratio, order map, and location map may be specified in a configuration file such that the association of such values defines a particular encoding algorithm. Alternatively, such values may be randomly generated from specified ranges, or may be generated by selection from pools of available values.

4.0 Implementation Mechanisms—Hardware Overview

Figure 6:
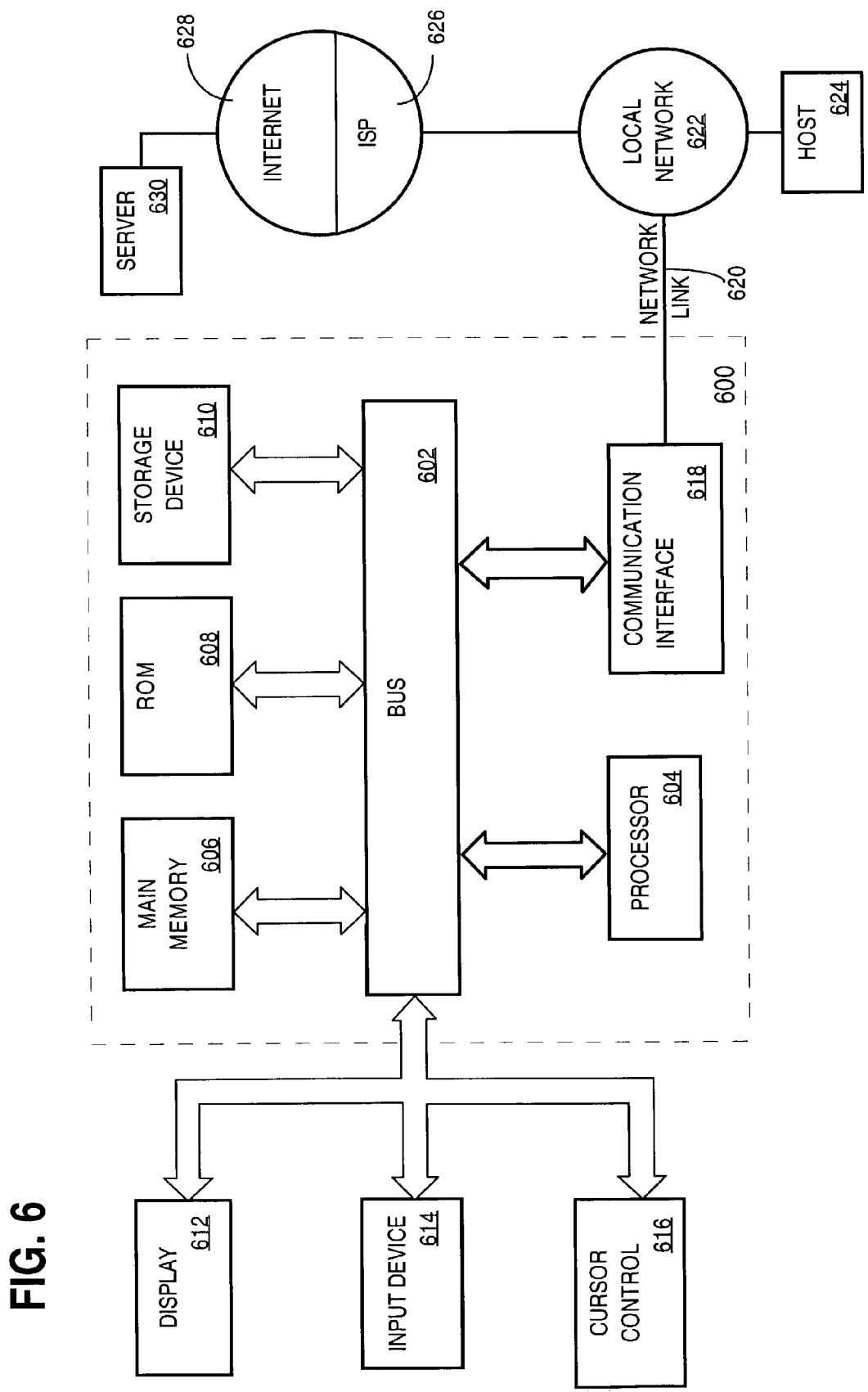
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for communicating state information in an electronic transaction message. According to one embodiment of the invention, communicating state information in an electronic transaction message is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for communicating state information in an electronic transaction message as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of communicating state information in an electronic message, the method comprising the computer-implemented steps of:
a transaction processor receiving a first request message of a transaction;
the transaction processor encoding first data representing a state of the transaction to result in creating an encoded message element that is impractical for a recipient to decode;
the transaction processor sending the encoded message element as part of a first response message associated with the transaction;
the transaction processor receiving a second request message associated with the transaction and responsive to the first response message, wherein the second request message includes the encoded message element; and
the transaction processor recovering the state of the transaction by decoding the encoded message element,
wherein the encoding step comprises steganographically encoding the first data in second data, and
wherein the first response message is a credit card authorization response, and the second request message is a credit card billing request associated with the credit card authorization response.

2. A method as recited in claim 1, wherein the encoding step comprises steganographically encoding the first data in second data, wherein a first length of the first data is related to a second length of the second data by a ratio that is sufficient to hide the first data.

3. A method as recited in claim 1, wherein the encoding step comprises steganographically encoding the first data in randomly selected second data.

4. A method as recited in claim 1, wherein the encoding step comprises steganographically encoding the first data in second data using an encoding algorithm that is selected from a fixed plurality of encoding algorithms, and wherein the encoded message element further comprises an identifier of the selected encoding algorithm.

5. A method as recited in claim 1, wherein the encoding step comprises steganographically encoding the first data in second data using an encoding algorithm that is selected from a first plurality of encoding algorithms, wherein the encoded message element further comprises an identifier of the selected encoding algorithm, and wherein the first plurality of encoding algorithms is periodically changed by selecting new encoding algorithms from among a second plurality of encoding algorithms.

6. A method as recited in claim 1, wherein the sending step comprises sending the encoded message element as part of a reply message associated with the transaction, without storing the state.

7. A method as recited in claim 1, wherein the step of receiving the second request message comprises receiving the second request message associated with the transaction, wherein the second request message includes the encoded message element in unmodified form.

8. A method as recited in claim 1, further comprising the steps of using the decoded state in processing the second request message, and repeating the preceding steps until completing processing of a transaction that is associated with the first request message, first response message, and second request message.

9. A method as recited in claim 1, wherein the first response message conforms to an XML-based protocol.

10. A method as recited in claim 1, wherein the encoding step is performed in response to receiving a credit card authorization request message and receiving a credit card authorization code.

11. A method as recited in claim 1, further comprising the steps of:
receiving the second request message;
temporarily storing the encoded message element;
performing an e-commerce transaction with a customer; and
creating and sending a third response message that includes the encoded message element in unmodified form.

12. A method as recited in claim 1, wherein the step of encoding first data comprises the steps of:
breaking the first data into one or more grains;
generating a distractor set;
disguising the grains to appear indistinguishable from the distractors;
determining a steganographic encoding ratio;
generating a placement map to determine the sequence and location of grains in the distractor mix;
generating an identifier that uniquely identifies values used in the preceding steps to enable later decoding of the first data; and
hiding the encoded packet in the electronic message.

13. A method as recited in claim 1, wherein the step of encoding first data comprises the steps of:
granularizing the first data into a grain sequence;
determining, based on a number of grains in the grain sequence, an encoding ratio;
providing the grain sequence to a resemblance mask to result in generating a semblance sequence;
generating the second data as a distractor sequence having a number of distractors greater than the number of grains based on the encoding ratio;
generating a placement map that specifies where to place the grains of the grain sequence among the distractors in the distractor sequence;

encoding the first data by arranging the grains of the grain sequence among the distractors of the distractor sequence as specified by the placement map; and placing the first data in the electronic message.

14. A method of communicating state information relating to an electronic commerce transaction that is performed among a merchant and a transaction processor, the method comprising the computer-implemented steps of:

a transaction processor receiving a first request message associated with the electronic commerce transaction from a merchant;

the transaction processor creating and storing first data representing a state of the electronic commerce transaction;

the transaction processor steganographically encoding the first data in second data to result in creating an encoded message element;

the transaction processor communicating the encoded message element to the merchant as part of a second response message associated with the electronic commerce transaction;

the transaction processor receiving a third request message from the merchant associated with the electronic commerce transaction and responsive to the second response message, wherein the third request message includes the encoded message element;

the transaction processor recovering the state of the electronic commerce transaction by decoding the encoded message element; and the transaction processor using the recovered state in processing the third request message, wherein the second response message is a credit card authorization response, and the third request message is a credit card billing request associated with the credit card authorization response.

15. A computer-readable medium carrying one or more sequences of instructions for communicating state information in an electronic message, which instructions, when executed by one or more processors, cause the one or more processors to carry out:

encoding first data representing a state of an electronic commerce transaction to result in creating an encoded message element that is impractical for a recipient to decode;

sending the encoded message element as part of a first response message associated with the electronic commerce transaction;

receiving a second request message associated with the electronic commerce transaction and responsive to the first response message, wherein the second request message includes the encoded message element; and recovering the state of the electronic commerce transaction by decoding the encoded message element, wherein the encoding step comprises steganographically encoding the first data in second data, and wherein the first response message is a credit card authorization response, and the second request message is a credit card billing request associated with the credit card authorization response.

16. An apparatus for communicating state information in an electronic message, comprising:

a network interface that is coupled to the data network for receiving one or more packet flows therefrom;

a processor;

one or more stored sequences of instructions which, when executed by the processor, cause the processor to carry out:

encoding first data representing a state of an electronic customer-merchant transaction to result in creating an encoded message element that is impractical for a recipient to decode;

sending the encoded message element as part of a first response message associated with the transaction;

receiving a second request message associated with the same transaction and responsive to the first response message, wherein the second request message includes the encoded message element; and recovering the state of the transaction by decoding the encoded message element, wherein the encoding step comprises steganographically encoding the first data in second data, and wherein the first response message is a credit card authorization response, and the second request message is a credit card billing request associated with the credit card authorization response.

17. An apparatus as recited in claim 16, wherein encoding first data comprises:

encoding the first data steganographically in randomly selected second data.

18. An apparatus as recited in claim 16, wherein encoding first data comprises:

encoding the first data steganographically in second data using an encoding algorithm that is selected from a fixed plurality of encoding algorithms, and wherein the encoded message element further comprises an identifier of the selected encoding algorithm.

19. An apparatus as recited in claim 16, wherein encoding first data comprises:

encoding the first data steganographically in second data using an encoding algorithm that is selected from a first plurality of encoding algorithms, wherein the encoded message element further comprises an identifier of the selected encoding algorithm, and wherein the first plurality of encoding algorithms is periodically changed by selecting new encoding algorithms from among a second plurality of encoding algorithms.

20. An apparatus as recited in claim 16, wherein sending the encoded message element comprises:

sending the encoded message element as part of a reply message associated with the transaction, without storing the state.

21. An apparatus as recited in claim 16, wherein the one or more sequences of instructions, when executed by the processor, cause the processor further to carry out:

using the decoded state in processing the second request message; and repeating the preceding steps until completing processing of a transaction that is associated with the first request message, first response message, and second request message.

22. An apparatus as recited in claim 16, wherein the one or more sequences of instructions, when executed by the processor, cause the processor further to carry out:

receiving the second request message;

storing temporarily the encoded message element;

performing an e-commerce transaction with a customer; and creating and sending a third response message that includes the encoded message element in unmodified form.

\* \* \* \* \*